United States Patent [19]
Hulyalkar

[11] 3,865,772
[45] Feb. 11, 1975

[54] POLYMERIZATION PROCESS

[75] Inventor: Ramchandra K. Hulyalkar, Oakland, N.J.

[73] Assignee: Dart Industries, Inc., Los Angeles, Calif.

[22] Filed: Dec. 5, 1973

[21] Appl. No.: 422,115

[52] U.S. Cl... 260/29.7 H, 260/78.5 R, 260/80.3 R, 260/80.6, 260/80.7, 117/124 D
[51] Int. Cl. ...... C08f 1/00, C08f 15/02, C08f 15/40
[58] Field of Search............. 260/29.7 H, 80.7, 80.6, 260/80.3 R, 78.5 R

[56] References Cited
UNITED STATES PATENTS
2,442,588   6/1948   D'Alelio............................. 260/84.5

*Primary Examiner*—Stanford M. Levin
*Attorney, Agent, or Firm*—Margareta LeMaire

[57] ABSTRACT

A two-step process involving bulk polymerization of a mixture of hydrophobic and hydrophilic monomers followed by emulsion polymerization conveniently yields a stable copolymer latex composition having improved properties. The process is particularly useful for preparing carboxylated styrene-butadiene latex compositions.

10 Claims, No Drawings

POLYMERIZATION PROCESS

This invention relates to an improved process for copolymerizing mixtures of hydrophobic and hydrophilic monomers, specifically useful for preparing copolymer latices.

In the past, latices have customarily been prepared by emulsion polymerization. When a hydrophilic monomer is used in conjunction with one or more hydrophobic monomers, polymerization tends to take place in the oil phase wherein the hydrophilic monomer is not appreciably soluble, hence the copolymerization proceeds inefficiently with slow and limited inclusion of the water-soluble monomer in the copolymer. Since hydrophobic monomers which by definition have low solubility in water, and water-soluble hydrophilic monomers do not tend to collect in the same phase in emulsions, copolymerization by emulsion polymerization becomes a problem as it is difficult to provide suitable contact between the monomers of dissimilar solubility and also to provide suitable contact with the polymerization catalyst (of either the water-soluble type or the oil-soluble type). A serious drawback therefore of a one-step emulsion process is that appreciable amounts of water soluble homopolymer of the hydrophilic monomer are produced, which render the final product less suitable for use in application where contact with water is unavoidable, said contact causing the water soluble homopolymer to be leached out from the polymer composition.

It is therefore the principal object of this invention to provide a process for copolymerizing mixtures of hydrophobic and hydrophilic monomers to yield stable latices.

It is a further object of this invention to provide an improved process for preparing copolymers of a hydrophobic monomer and hydrophilic monomer.

It is further an object of this invention to provide a process for efficient preparation of a latex of carboxylated styrene-butadiene of relatively high carboxyl content.

It has been discovered that the foregoing objects can be attained by a two-step polymerization process involving bulk copolymerization and emulsion copolymerization steps, in which a mixture of hydrophobic and hydrophilic monomers is first bulk copolymerized to a limited extent. The reaction mixture containing prepolymer and unreacted monomers is subsequently emulsified in water and the copolymerization is continued in the presence or absence of further added hydrophobic monomers under emulsion polymerization conditions. By this process polar groups are conveniently introduced into the copolymer system and the concentration of hydrophilic homopolymer in the final reaction product is minimized. The reason for this is that the copolymer of hydrophilic and hydrophobic monomers produced in the first step is less hydrophobic than the homopolymer of the hydrophobic monomer or the hydrophobic monomer itself. Thus, further copolymerization with hydrophilic monomer is less hindered than in the case of a one step emulsion polymerization process.

The hydrophobic monomers that can be polymerized in accordance with this invention include those which have a solubility in water of less than 1 percent by weight such as alpha-olefins, water insoluble vinyl monomers and conjugated dienes or mixtures thereof. Examples of alpha-olefins include ethylene, propylene, butylene, isobutylene and the like. Among the vinyl monomers vinyl halides, vinyl ethers and vinyl aromatics such as styrene and substituted styrenes including halogenated styrenes, alkyl and alkoxy substituted styrenes are well suited for the process. Specific examples of such vinyl monomers include vinyl chloride, vinyl propionate, styrene, α-methyl styrene, 2-methylstyrene, 4-methylstyrene-4-ethylstyrene, 4-chlorostyrene, 4-methoxystyrene and the like. Conjugated diene monomers particularly useful in this invention include butadiene-1,3, isoprene, chloroprene, 2,3-dimethylbutadiene-1,3, 2-methylbutadiene-1,3, and other substituted butadienes containing conjugated double bonds. As mentioned before mixtures of the above mentioned hydrophobic monomers can be used in the process of the invention. For instance in the preparation of elastomeric latices, the hydrophobic monomer can be a mixture of a conjugated diene such as butadiene-1,3 and a vinyl aromatic such as styrene.

The hydrophilic monomers useful in this invention include substantially water-soluble polymerizable and ethylenically unsaturated hydrophiles including ethylenically unsaturated mono- or poly-carboxylic acids or mixtures thereof, for example acrylic acid, methacrylic acid, itaconic acid, ethacrylic acid, crotonic acid, α-chloroacrylic acid, and the like. In the preparation of hydrophile modified elastomeric latices, such as carboxylated styrene-butadiene rubber latex compositions, the preferred hydrophilic monomers include acrylic acid, α-substituted acrylic acids such as methacrylic acid or α-chloroacrylic acid. Other water soluble monomers could be copolymerized with the same advantage.

In general, the overall proportions of the hydrophobic and hydrophilic monomers may vary within relatively wide limits provided that the major portion of the total monomer, i.e., above 50% to about 99% by weight of the monomer is of hydrophobic character. Preferably at least 70 weight percent and more preferably 80 to 99 weight percent of hydrophobic monomer is used based on the total hydrophobic and hydrophilic monomers charged to the reaction. As mentioned above preferred elastomeric hydrophile-containing copolymers are prepared from a mixture of a vinyl aromatic compound and a conjugated diene as the hydrophobic monomer cmponent and a carboxyl-containing monomer as the hydrophilic monomer component. Thus the mixture of hydrophobes comprises the major portion of the monomer components which preferably represent about 80 to 99 weight percent thereof with the remaining 1 to 20 weight percent represented by the hydrophilic monomer. More specifically the monomer components are preferably in the proportions of 30 to 70 weight percent of the vinyl aromatic monomer, 30 to 60 weight percent of the conjugated diene monomer and 1 to 20 weight percent of a carboxyl-containing monomer, all percentages based on the total of monomers charged to the reaction.

In the first stage, all of the hydrophilic monomer and at least a portion of the hydrophobic monomer are charged to an agitated reaction zone. The weight ratio of hydrophobic monomer to hydrophilic monomer should be at least 1:1. The bulk copolymerization is initiated by either heat, irradiation but more conveniently by an oil-soluble free radical initiator. The preferred oil-soluble catalyst for the bulk polymerization include azonitriles, such as 2,2'-azobisisobutyronitrile, 2,2'-azobis-2,3-dimethylbutyronitrile, and the like; alkyl peroxides, such as ethyl peroxide, tertiary butyl peroxide, cumyl peroxide, and the like; acyl peroxides, such as acetyl peroxide, benzoyl peroxide, lauroyl peroxide, and the like; hydroperoxides, such as tertiary butyl hydroperoxide, cumene hydroperoxide, and the like; ketone peroxides such as methyl ethyl ketone peroxide, cyclohexyl ethyl ketone peroxide, and the like; and peresters and peroxy carbonates, such as tertiary butyl peracetate, tertiary butyl perbenzoate, ethyl tertiary butylperoxyisopropyl carbonate, diethyl peroxydicarbonate and the like.

The amount of catalyst used may vary within wide limits, herein defined as a catalytic amount, generally in the range of from about 0.01 to about 2% but preferably in the range of 0.1 to 1% based on the weight of the total monomer charge to the overall process. The conditions maintained in the first stage bulk polymerization include temperatures from about −5°C and up to 150°C or even higher and preferably from 50°C to 95°C, and pressures at least sufficient to maintain the monomers in a liquid state. The reaction should be carried out in the absence of oxygen, since oxygen acts as a polymerization inhibitor. The polymerization is allowed to proceed for a sufficient length of time to obtain between about 5 and about 25 percent by weight of a prepolymer based on the total amount of monomers charged to the overall reaction (stage 1 and 2). The conversion of the monomers to prepolymer is suitably monitored by conventional solids determinations on samples withdrawn periodically from the reaction zone.

After completion of the first stage bulk copolymerization, the reactor system is converted into an emulsion polymerization system by mixing the first stage reaction mixture with water, emulsifier and water-soluble free radical initiator. Although separate reactors can be used for the first and second stage copolymerization reactions, it is preferable to employ the same reactor for both stages and the conversion into an emulsion polymerization system is simply carried out by adding an aqueous solution of at least portions of the emulsifier and catalyst to the bulk copolymerization reactor. Any remaining portions of hydrophobic monomer, water-soluble catalyst, emulsifier and water not initially charged to the emulsion polymerization system can be added to the reactor on a batch, intermittent or continuous basis during the emulsion polymerization.

The amount of water used in the second stage is not critical. Usually the ratio of water to total monomers charged to the overall process is preferably in the weight range of 5:1 to 1:2 and more conveniently in the range of 2:1 to 1:1.

The emulsifiers used in the present invention can be any of the well known synthetic anoinic and nonionic emulsifiers or mixtures thereof, including the anionic surfactant such as: alkyl sulfates and sulfonates, such as sodium lauryl sulfate, sodium salts of sulfonated petroleum or paraffin oils, sodium 1-dodecanesulfonate, alkali metal salts of octadecane-1-sulfonic acid, arylalkyl sulfonates such as sodium isopropylbenzenesulfonate, sodium isobutylnaphthalenesulfonate, alkali metal salts of sulfonated dicarboxylic acid esters such as sodium dioctyl sulfosuccinate, sodium N-octadecyl sulfosuccinate, and the like; or cationic emulsifiers, such as laurylamine hydrochloride, trimethyl cetyl ammonium bromide, and the like; nonionic surfactants including alkylene oxides and alkyl aryl polyether alcohols, polyoxyethylene monoalkyl ethers and the like. The amount of emulsifier used may vary from 0.1 to 20 percent and preferably range from 3 to 10 percent based on the total weight of the monomers charged to the overall reaction.

The water-soluble free radical catalysts used in the present invention include peroxy compounds such as perborates, percarbonates, peracetates, but preferably persulfates in the form of ammonium, sodium or potassium salts thereof. The amount of emulsion polymerization catalysts varies from about 0.01 percent or less to about 2 percent or more but preferably 0.1 to 1 percent by weight of the total monomer charge in the bulk polymerization step and in the emulsion step.

The emulsion polymerization is conducted from about −5°C to about 120°C, preferably from about 0° to 90°C and under pressure sufficient to maintain the monomers in liquid phase. As in the first stage the polymerization should be conducted in the substantial absence of oxygen to avoid catalyst inhibition.

The polymerization is allowed to proceed for a length of time sufficient to convert at least 60 percent by weight of the monomers charged to the overall reaction, at which point the reaction may be stopped, if desired, to minimize crosslinking. Any of the well known inhibitors may be used for this purpose, such as hydroquinone, sodium dimethyl dithiocarbonate, sodium dithionite and the like. Usually the polymerization is allowed to proceed without addition of inhibitor to obtain conversions above 80% by weight and preferably until substantially complete conversion (e.g., about 95 percent and above) of the monomers has been achieved.

Various modifiers and additives can be added to any of the polymerization stages after completion of the polymerization or during further processing of the final product. Such modifiers and additives include chain transfer agents, e.g., long chain mercaptans. Other additives include chelating agents, buffers, and other additives for controlling pH, dyes, pigments stabilizers, thickeners, antoxidants, fillers, and the like.

The polymers of this invention are obtained as neutral or acidic aqueous polymer latices and are useful directly in this form in a variety of applications. The copolymer can also be isolated using conventional spray drying techniques to yield a powder or any of the well known coagulation techniques followed by filtration to recover the coagulated polymer, washing and drying.

There are many advantages of the two stage process of the present invention as compared to prior art one-step emulsion processes. Specifically it has been found that the overall reaction is considerably faster and that more efficient use of the hydrophilic monomer component is achieved, with inherent cost savings. Also, the final product obtained in the process of the invention exhibits improvements in a variety of properties associated with the superior adhesiveness, which in turn is due to the greater incorporation of hydrophilic segments in the copolymer chains. For instance, improvements are obtained in dry abrasion, printing ink substantivity, crock fastness, dye and pigment binding strength and the like. These qualities render the products of the present invention particularly suitable in formulations of latex paints, adhesives and coatings, backings and bonding agents for wood, paper, fibers, textiles and the like. Carboxylated styrene-butadiene latices are especially suitable in these applications. Foamed products can also be obtained by reacting the carboxylated copolymer with a carbonate, such as sodium carbonate, which reaction generates carbon dioxide which acts as the foaming agent.

In order to provide a better understanding of the invention reference is had to the following examples.

In the examples the relative amounts of hydrophilic and hydrophobic groups present in the copolymer products were determined by a procedure based on the intensity ratios of a characteristic absorption peak of the hydrophilic group and of the predominant hydrophobic group in the in the infrared spectrum of the copolymer. Films of the latex were cast on glass plates, dried and washed with water to remove water-soluble components. The characteristic absorption peaks were chosen and the intensities measured and the peak intensity ratio computed. This method does not yield quantitative results, but allows a convenient comparison of the relative hydrophile content of copolymers of similar composition prepared by different procedures.

The surface tensions of the latices were determined by Fisher Surface Tensiometer.

CONTROL EXAMPLE I

The copolymer latex of this example was prepared from styrene, butadiene and methacrylic acid in accordance with the prior art one-step emulsion polymerization technique. A pressure reactor was first charged with the ingredients listed below:

Mixture A

| Ingredients | Parts |
| --- | --- |
| Water | 90 |
| Nonyl phenoxypoly(ethyleneoxy)ethanol (nonionic surfactant) | 2.6[1] |
| Sodium lauryl sulfate (anionic surfactant) | 0.75[2] |
| Ethylenediaminetetraacetic acid disodium salt, (chelating agent) | 0.1 |
| Ammonium chloride (electrolyte) | 0.11 |
| Sulfonated naphthalene formaldehyde sodium salt (emulsion stabilizer) | 0.19 |
| Potassium persulfate (catalyst) | 0.6 |
| Methacrylic acid (monomer) | 2.5 |

[1] on dry basis; charged as a 70% solution in water
[2] on dry basis; charged as a 30% solution in water The remaining monomers and a chain transfer agent were mixed separately in the proportions listed below.

Mixture B

| Ingredients | Parts |
| --- | --- |
| Styrene | 60 |
| 1,3-Butadiene | 37.5 |
| t-dodecyl mercaptan | 0.25 |

Also a soap solution was made up as listed below.

Mixture C

| Ingredients | Parts |
| --- | --- |
| Water | 20 |
| Nonylphenoxypoly(ethyleneoxy)ethanol | 2.6 |
| Sodium lauryl sulfate | 0.75 |

To the contents of the reactor was added one-fourth of the mixture B, the reactor was closed and the temperature was slowly increased from 22°C to 60°C in 2 hours with continuous agitation, which conditions were maintained for the duration of the run. Incremental additions of Mixtures B and C were made to the reactor at the times specified below:

| Time-Hours | Temperature | Mixture A | Mixture B |
| --- | --- | --- | --- |
| 0 | 22°C | ¼ | — |
| 2 | 60°C | ¼ | — |
| 3 | 60°C | ¼ | ½ |
| 4 | 60°C | ¼ | ½ |

After the last addition the reaction was allowed to proceed for another 2 ½ hours. The product was then cooled, filtered through cloth and stored at room temperature. Based on solids determination (45% by weight) the conversion was calculated to be 92%. The latex had a pH of 3.4 and a surface tension of 41.6 dynes/cm. Films were cast of the latex, dried and washed. The carboxyl/styrene ratio was determined to be 0.48 using the technique described above.

EXAMPLE II

This example demonstrates the superior result had when polymerizing the same proportions of the monomers of Control Example I employing the two-step polymerization technique of the present invention.

In the bulk polymerization step a mixture of 60 parts styrene, 37.5 parts 1,3-butadiene, 2.5 parts methacrylic acid, 0.25 parts t-dodecyl mercaptan and 0.33 parts azobisisobutyronitrile (catalyst) was charged to the pressure reactor and heated to 50°C with agitation; after which the following heating cycle was employed.

| Time, Hours | Temp. °C |
| --- | --- |
| ½ | 50 |
| ½ | 60 |
| ½ | 70 |

At the end of the heating cycle, solids determination of a small sample showed that about 8.5% by weight of the monomers had been converted to polymer. At this time the reactor content was converted to an emulsion by the addition of a solution of 5.25 parts of the nonionic and 1.1 parts of the anionic surfactant of Control Example I in 110 parts of water. The solution also contained 0.6 parts of potassium persulfate (catalyst). The emulsion polymerization was carried out with agitation for 4 hours at 70°C, then cooled, filtered through cloth and stored. Solids determination of the latex (47% by weight) indicated that the monomer conversion was about 95% by weight.

The latex was extremely stable and had a pH of 2 and a surface tension of 49.8 dynes/cm. The carboxyl/styrene ratio of the copolymer was 1.0.

EXAMPLE III

Another experiment was carried out according to the invention repeating the bulk polymerization step of Example II except that the catalyst was benzoyl peroxide (0.33 parts) and the reaction was carried out at 75°C for 3 ½ hours. This resulted in an 18% conversion to monomer.

The system was converted to an emulsion polymerization system by the addition of 6.8 parts anionic surfactant ammonium nonylphenoxy poly-(ethylenoxy)ethyl sulfate, 0.25 parts potassium chloride, 0.1 part disodium salt of ethylenediamine tetraacetic acid, and 0.5 parts potassium persulfate in 110 parts of water and the reaction was allowed to proceed for 3 hours at 60°C with agitation. At this point (88% conversion) the reaction mixture was cooled, filtered and stored.

The product was a latex of pH3, 44% solids level and had a surface tension of 57 dynes/cm. The carboxyl/styrene ratio was 0.98.

EXAMPLE IV

The procedure of Example II was repeated except that the first step bulk polymerization was carried out at 75°C for 3 ½ hours to 14% conversion of monomers. Also, in the second stage the method differed from that of Example II in that 117 parts of water was used instead of 110 parts, 0.2 parts of disodium salt of ethylene diamine tetraacetic acid was also added to the reaction mixture and the reaction was carried out at 60°C for 4 hours to substantially completion. The carboxy/styrene ratio of the product was 0.75 and the latex had a pH of 5.4 and a surface tension of 50 dynes/cm.

It is to be understood that various modifications may be made to the described process without departing from the scope of the invention.

What is claimed is:

1. A process for the production of a copolymer from at least one hydrophobic monomer and at least one hydrophilic monomer which comprises:
   a. charging all of the hydrophilic monomer selected from at least one ethylenically unsaturated monocarboxylic or polycarboxylic acid and at least a portion of the hydrophobic monomer selected from alpha-olefins, water insoluble vinyl monomers, conjugated dienes or mixtures thereof such that the weight ratio of hydrophobic to hydrophilic monomer is at least above 1:1;
   b. reacting under bulk polymerization conditions said monomers to produce a reaction mixture containing a prepolymer amounting to between about 5 and about 25 percent by weight based on the total monomers charged to the process;
   c. converting the reaction mixture to an emulsion;
   d. further polymerizing the reaction mixture in the presence of a water soluble catalyst under emulsion polymerization conditions to convert at least 60 percent by weight of the total monomers charged to the process;
   the amount of hydrophobic monomer charged to the process ranging from above about 50 to about 99 percent by weight of the total monomers.

2. The process of claim 1 wherein the total monomers are charged to step (a).

3. The process of claim 1 wherein the reaction mixture is emulsion polymerized in the presence of further added hydrophobic monomer.

4. The process of claim 1 wherein the hydrophobic monomer is a mixture of a conjugated diene and a vinyl aromatic compound.

5. A process for the production of a carboxylated latex composition which comprises:
   a. reacting in the presence of an oil-soluble catalyst and under bulk polymerization conditions about 1 to 20 percent by weight of an ethylenically unsaturated carboxylic acid and about 80 to 99 percent of a mixture of a conjugated diene and a vinyl aromatic compound to product a reaction mixture containing a prepolymer amounting to between about 5 and about 25 percent by weight based on the total monomers charged to the overall process;
   b. converting the reaction mixture to an emulsion; and
   c. further polymerizing the reaction mixture in the presence of a water-soluble catalyst under emulsion polymerization conditions to convert at least 60 percent by weight of the total monomers charged to the process.

6. The process of claim 5 wherein the ethylenically unsaturated carboxylic acid is selected from acrylic acid or α-substituted acrylic acids.

7. The process of claim 5, wherein the conjugated diene is butadiene-1,3.

8. The process of claim 5, wherein the vinyl-aromatic compound is selected from styrene or substituted styrenes.

9. The process of claim 5, wherein the bulk polymerization is carried out at a temperature in the range of from about −5°C to about 150°C and the emulsion polymerization is carried out at a temperature of from about −5°C to about 120°C.

10. A process for the production of a carboxylated latex which comprises:
    a. reacting in the presence of an oil-soluble catalyst and under bulk polymerization conditions about 1 to 20 percent by weight of methacrylic acid, about 30 to 70 percent by weight of styrene and about 30 to 60 percent by weight of butadiene-1,3 at a temperature in the range from about 50°C to about 95°C to produce a prepolymer amounting to between about 5 and about 25 percent by weight of the total monomers charged to the process;
    b. converting the reaction mixture to an emulsion;
    c. further polymerizing the reaction mixture in the presence of a water-soluble catalyst under emulsion polymerization conditions including a temperature in the range from about 0°C to about 90°C to convert at least 60 percent by weight of the total monomers charged to the process.

* * * * *